United States Patent [19]

Hanakata et al.

[11] Patent Number: 5,577,906
[45] Date of Patent: Nov. 26, 1996

[54] CATALYST FOR COMBUSTION

[75] Inventors: Yoshio Hanakata, Ichikawa; Tomiaki Furuya, Yokohama, both of Japan

[73] Assignee: Kabushiki Kaisha Toshiba, Kanagawa-ken, Japan

[21] Appl. No.: 360,883

[22] Filed: Dec. 21, 1994

[30] Foreign Application Priority Data

Dec. 22, 1993 [JP] Japan .................. 5-324374

[51] Int. Cl.$^6$ .................................. F23Q 11/00
[52] U.S. Cl. .................. 431/268; 431/7; 431/11; 431/12; 431/326; 60/39.822
[58] Field of Search ..................... 431/7, 11, 12, 431/326, 268; 60/39.822

[56] References Cited

U.S. PATENT DOCUMENTS

| | | | |
|---|---|---|---|
| 3,928,961 | 12/1975 | Pfefferie | 431/7 |
| 4,354,821 | 10/1982 | Kesselring et al. | 431/7 |
| 4,375,949 | 3/1983 | Salooja | 431/7 |
| 4,459,126 | 7/1984 | Krill et al. | 431/7 |
| 5,228,847 | 7/1993 | Lywood et al. | 431/7 |

FOREIGN PATENT DOCUMENTS

| | | |
|---|---|---|
| 1919336 | 10/1969 | Germany. |
| 3543640A1 | 6/1987 | Germany. |
| 61-259013 | 11/1986 | Japan. |

*Primary Examiner*—Larry Jones
*Attorney, Agent, or Firm*—Finnegan, Henderson, Farabow, Garrett & Dunner, L.L.P.

[57] ABSTRACT

A combustion catalyst is disclosed which is composed of a durable support containing a plurality of mutually partitioned and independent combustion gas flow paths and an active catalyst formed mainly of palladium and/or palladium oxide and deposited in the form of a coating on the inner wall surfaces of the combustion gas flow paths and characterized in that the deposition of the active catalyst in the form of a coating on all the inner wall surfaces is omitted in part of the whole of the combustion gas flow paths. The mutually partitioned and independent combustion gas flow paths which are provided for the durable support jointly form an aggregate of opening parts in the pattern of gratings and these opening parts have a square, rectangular, triangular, or hexagonal cross section. Thus, the durable support constitutes a so-called honeycomb structure.

11 Claims, 4 Drawing Sheets

CATALYST FOR COMBUSTION

BACKGROUND OF THE INVENTION

1. Field of the Invention

This invention relates to a combustion catalyst suitable for such a combustion device as the gas turbine which is required to possess durability to resist elevated temperatures.

2. Description of the Related Art

In recent years, the universal appreciation of the eventual exhaustion of the earth's oil resources has become to direct due attention to the necessity for developing an alternative energy and to the imperativeness of efficient utilization of energy resources. To fulfill the necessity, a gas turbine•steam turbine combined cycle electric power generation system using natural gas as the fuel and a coal gasification gas turbine•steam turbine combined cycle electric power generation system have been developed. Since these electric power generation systems enjoy high efficiency of power generation as compared with the electric power generation systems operated with the conventional steam turbines using fossil fuels, they are attracting attention as systems which are capable of effectively converting such fuels as natural gas and coal gas into electric power.

Incidentally, for the gas turbine combustor which is used in the gas turbine electric power generation system, the method of combustion by a homogeneous system (vapor-phase) reaction which implements the combustion of a gas containing a fuel gas and an oxidizing gas (gas for combustion) such as, for example, a mixture of a fuel gas with air by igniting the mixture by means of a spark plug is adopted.

FIG. 6 is a cross section illustrating an example of the construction of the essential part of a gas turbine combustor; 1 standing for a housing, 2 for a combustion nozzle, 3 for a spark plug (ignition element), and 4 for an a gas feed path provided on a lateral wall thereof with an air feed inlet 4a for feeding air as one of the components for combustion, a cooling air feed inlet 4b, and a diluting air feed inlet 4c and adapted to feed a required combustion gas to a turbine nozzle 5. In the combustor mentioned above, the fuel gas spouted through the combustion nozzle 2 is mixed with the air fed through the combustion air feed inlet 4a and the resultant mixture is ignited for combustion by the spark plug 3. In consequence of this combustion, necessary air supplies are made through the cooling air feed inlet 4b and the diluting air feed inlet 4c and the combustion gas which has been consequently cooled to a prescribed temperature (the turbine inlet temperature) is advanced through the turbine nozzle 5 and injected into the turbine.

Since the gas turbine combustor mentioned above generally uses air as the gas for combustion, however, the formation of nitrogen oxides ($NO_x$) during the combustion poses a problem. The amount of nitrogen oxides so formed abruptly increases when the combustion temperature surpasses 1500° C. Since a distribution of the fuel concentration is present inside the combustor, the interior of the combustor partly contains sites of temperatures exceeding 1500° C. Thus, the gas turbine inevitably entails formation of nitrogen oxides in a large amount and necessitates extra provision of an expensive SCR (Selective Catalytic Reduction).

To cope with this problem, the method of combustion which comprises causing a heterogeneous system reaction by burning a combustion gas by means of a catalyst and further continuously causing a vapor-phase combustion has been proposed (Japanese Patent Publication No. HEI-02-45, 772). Since this method of combustion resorting to a catalyst permits the combustion to start at a relatively low temperature and causes the temperature of this combustion to rise gently and enables the maximum temperature of the combustion to be repressed to a low level, it is at an advantage in not merely enabling the combustor itself to enjoy durability but also decreasing the amount of nitrogen oxides to be formed even when air is adopted as the oxidizing gas in the combustion gas (the gas comprising a fuel gas and an oxidizing gas).

FIG. 7 is a cross section illustrating with a model part of the construction of a catalyst used in a gas turbine combustor of the conventional method of catalytic combustion mentioned above; 6 standing for a durable support provided with a multiplicity of independent partitioned fuel gas flow paths 6a and 7 for an active catalyst deposited in the form of a coating on the inner wall surfaces of the combustion gas flow paths 6a of the durable support 6 mentioned above.

Incidentally, as a concrete example of the active catalyst, an active catalyst which has palladium and/or palladium oxide as main components thereof may be cited.

The active catalyst having palladium and/or palladium oxide as the main components thereof as mentioned above, however, has the state thereof varied by the oxygen release equilibrium which is fixed by the oxygen partial pressure and the temperature of the ambient air as illustrated in FIG. 8. Specifically, the palladium in the active catalyst is liable to assume the form of metallic palladium when the temperature is higher than the equilibrium temperature and the form of palladium oxide when the temperature is lower than the equilibrium temperature. At temperatures exceeding 900° C., for example, substantially all the palladium assumes the state of metallic palladium even when the partial pressure of oxygen is about 1 atmosphere. Since the metallic palladium has a lower catalytic activity than palladium oxide, the catalytic activity is lowered and the heat quantity generated in consequence of combustion is decreased and the catalyst temperature is made to level off when the temperature is higher than the temperature of the oxygen release equilibrium. As a result, the active catalyst acquires the self control property of preventing its own temperature from rising above a fixed level and, consequently, adapts itself for a gas turbine.

Where other noble metal such as, for example, platinum is used for a catalyst, the activity of this catalyst continues to increase with the elevation of the temperature of the catalyst. As a result, this catalyst is at a disadvantage in entailing the so-called temperature run-away that the catalytic activity is exalted and the temperature of the catalyst is further elevated even by only a slight rise of temperature due to the temperature of the combustion gas and the concentration of the fuel.

Though the palladium based catalyst to be used in the method of combustion mentioned above has the advantage of permitting easy repression of the temperature run-away, it still has a problem in terms of service in the actual operation of a gas turbine.

When a combustion catalyst of palladium measuring 17 cm in length and having a construction the essential part of which is illustrated in a cross section in FIG. 7 is tested with the fuel concentration varied in the combustion gas fed to the inlet of the combustion gas flow path 6a to evaluate the combustion catalyst based on the efficiency of the palladium based catalyst and the temperature of the combustion gas at the outlet of the combustion gas flow path 6a, the results are as shown in FIG. 9. First, it is remarked that while the fuel concentration is low at the inlet of the combustion gas flow path 6a, the amount of the fuel consumed by the reaction per unit time per unit amount of catalyst is increased and the efficiency of the catalyst is exalted in proportion as the concentration is increased. In FIG. 9, the curve 1 represents the efficiency of the catalyst and the curve 2 the temperature of the catalyst. The term "efficiency of catalyst" as used herein means the ratio of the amount of the fuel burned to the total amount of the fuel supplied.

When the fuel concentration is further increased and, as a consequence, the temperature of the catalyst elevated by the combustion is caused to surpass the oxygen release temperature of palladium oxide, however, there arises an area in which the activity of the catalyst levels off. In consequence of this maximization of the activity of the catalyst, the temperature of the combustion gas at the outlet of the combustion gas flow path 6a levels off in the neighborhood of the equilibrium oxygen release equilibrium temperature of palladium oxide.

When the concentration of the fuel in the combustion gas is further increased, there arises an area in which a vapor-phase homogeneous reaction (combustion) abruptly occurs in the combustion catalyst (as in the combustion gas flow path 6a, for example) and the efficiency of the catalyst and the temperature of the catalyst are increased. In this area, practical operation of the combustion catalyst is no longer obtained because the temperature of the combustion catalyst is controlled only with great difficulty and the combustion catalyst is fused and the activity of the catalyst is sharply deteriorated.

In short, when a palladium system is used as a catalytically active component of the catalyst for the gas turbine combustor, accurate control of the fuel concentration in the combustion gas and the temperature and the flow rate of the combustion gas forms an indispensable condition. This fact constitutes a grave problem to be encountered in the feasibilization of the catalyst.

SUMMARY OF THE INVENTION

This invention has been produced to cope with such true state of prior art as mentioned above.

An object of the present invention is to provide a combustion catalyst for use in the combustor of a gas turbine which enables the gas turbine to be continuously operated as required with high reliability while repressing and preventing such adverse factors as abrupt temperature rise even when the operating conditions of the gas turbine are varied.

The first combustion catalyst according to this invention comprises a durable support containing a plurality of mutually partitioned and independent combustion gas flow paths and an active catalyst comprising mainly of palladium and/or palladium oxide deposited on the inner wall surfaces of the combustion gas flow paths, wherein the deposition of the active catalyst on all the wall surfaces is omitted in part of the whole combustion gas flow paths.

The second combustion catalyst according to this invention comprises a durable support containing a plurality of mutually partitioned and independent combustion gas flow paths and an active catalyst comprising mainly of palladium and/or palladium oxide deposited on the inner wall surfaces of the combustion gas flow paths, wherein the deposition of the active catalyst on all the inner wall surfaces is not effected in at least one of each pair of adjoining combustion gas flow paths in the whole combustion gas flow paths.

The third combustion catalyst according to this invention comprises a durable support containing a plurality of mutually partitioned and independent combustion gas flow paths, wherein the durable support comprises a durable support part provided with combustion gas flow paths having an active catalyst comprising mainly of palladium and/or palladium oxide deposited on all the inner wall surfaces thereof and a durable support part provided with combustion gas flow paths having the deposition of the active catalyst on the inner wall surfaces thereof partly omitted, and has the durable support parts disposed in series in the direction of the flow of the combustion gas.

The active catalyst may be deposited directly in the form of a coating on a heat-resistant support. Otherwise, crude catalyst particles which are obtained by depositing active catalyst particles on particles of a heat-resistant substance may be deposited in the form of a coating layer through the medium of a binder on a heat-resistant support. Of these two forms of active catalyst, the latter proves to be more desirable than the former because the individual active catalyst particles succumb less easily to cohesion while the catalyst is in service and the active catalyst consequently enjoys a longer service life.

The "main component" which is implied by the expression "active catalyst which has palladium and/or palladium oxide as main components" used above means the metallic element or the oxide thereof which accounts for not less than 20 atomic percent of the total of metallic elements in all the active catalyst components deposited on the durable support. In cases where the total content of all the metallic elements is less than 20 atomic percent, the "main component" means the metallic element or the oxide thereof which is contained in the largest amount.

As concrete examples of the co-catalyst which may be used in addition to the main component, nickel, magnesium, titanium, vanadium, chromium, manganese, iron, cobalt, copper, zinc, molybdenum, ruthenium, rhodium, silver, platinum, gold, rare earth elements including lanthanoide series (scandium, yttrium, lanthanum, cerium, praseodymium, neodymium, promethium, samarium, europium, gadolinium, terbium, dysprosium, holmium, erbium, thulium, ytterbium, and lutecium), and oxides and other compounds of these metals may be cited. Particularly, the addition of nickel or the oxide thereof is effective in exalting the catalytic activity.

As concrete examples of the heat-resistant substance which is effectively used as the carrier for the active catalyst, such ceramic substances as oxides, nitrides, and carbides may be cited. Some metallic carriers react with the air for combustion, oxidize themselves, and eventually convert themselves into oxide carriers. Such metallic carriers as avoid this conversion may be used in their original metallic form. Among the substances mentioned above, metal oxides, particularly the oxides of transition metal elements prove to be desirable because they aid in the manifestation of a catalytic quality. Among the metal oxides mentioned above, zirconia ($ZrO_2$) proves to be particularly desirable. Especially, cubic system zirconia stabilized with yttria ($Y_2O_3$) is used desirably. A combined system of two or more such heat-resistant substances may be used when necessary.

Though the mixing ratio of the catalytically active component and the heat-resistant substance is not particularly limited, the proportion of the catalytically active component is generally selected in the range of from 10 to 70% by weight (preferably from 40 to 60% by weight; with the heat-resistant substance accounting for the balance). If the amount of the active component is unduly small, the produced catalyst will not fully manifest the activity thereof because of shortage of active sites. Conversely, if this amount is unduly large, the heat-resistant substance will no longer manifest the effect of preventing the phenomenon of sintering and the available surface area of the metal in the catalyst will be quickly decreased and the activity of the catalyst will be degraded by sintering.

Further, in the catalytically active component, the particle size of the crude catalyst particles deposited on the heat-resistant substance is desired to be in the approximate range of from 0.1 to 100 μm. In cases where the catalyst has been manufactured by milling the active component and the heat-resistant substance, it is desirable that primary particles having a smaller particle diameter may undergo cohesion and give rise to secondary particles having a particle diameter which falls in the range mentioned above.

As respects the method for the production of the catalyst according to this invention, the first step consists in preparing powders which respectively contain a catalytically active component or an active component and a heat-resistant substance. The powders containing the catalytically active component and the heat-resistant substance may be a mixed powder containing these two substances together, a powder in such a form as has particles of the catalytically active component deposited (in the form of a coating) on particles of the heat-resistant substance, a powder in such a form as has particles of the particles of the heat-resistant substance deposited (in the form of a coating) on particles of the catalytically active component, or a mixture of the two or more forms of powder mentioned above.

The mixed powder of the catalytically active component and the heat-resistant substance may be obtained by simply mixing the powders of these two components. Preferably, however, it is obtained by milling the two components by means of a ball mill. The atmosphere which envelopes the site of milling is not relevant. This milling goes to exalt the interaction between the two components because it adds to the intimacy of contact between the catalytically active component and the heat-resistant substance, increases the available area of contact, and enables the mixed components to remain in highly desirable mutual contact.

The powder of the form having the catalytically active component deposited (in the form of a coating) on the heat-resistant substance or the powder of the form having the heat-resistance substance deposited (in the form of a coating) on the catalytically active component can be obtained by the impregnation method, plating method (such as, for example, the procedure which comprises subjecting a substratal component to a treatment with an aqueous tin chloride solution to make tin particles and a treatment with an aqueous palladium chloride solution to substitute the tin particles consequently precipitated by palladium particles, and to form plating cores), spattering method, or coprecipitation method, for example.

The incorporation of the co-catalyst in the catalyst may be effected either at the same time that the catalytically active component and the heat-resistant substance are mixed or after the mixture has been completed. Otherwise, the co-catalyst may be added together with the catalytically active component either during the preparation of the powder of the form having the catalytically active component deposited (in the form of a coating) on the heat-resistant substance or the powder of the form having the heat-resistance substance deposited (in the form of a coating) on the catalytically active component or after the preparation has been completed.

A second step consists of the process in which the powder containing a catalytically active component is deposited on the durable support.

As concrete examples of the durable support which serves the purpose of supporting a palladium based catalytic powder in the form of a coating layer in this invention, plates, corrugated plates, pipes, and honeycombs containing square, rectangular, triangular, and hexagonal opening parts which are made of heat-resistant ceramic substances or heat-resistant oxidationproof metallic substances may be cited. The durable support is desired to be constructed in the shape of a honeycomb in consideration of ampleness of the freedom of selection of the flow paths to be used for carrying the catalyst (in the form of a coating).

When the combustion catalyst is used in a gas turbine combustor, the durable support is specifically formed of a material which possesses stability in an oxidizing atmosphere held at an elevated temperature of about 1200° C. As concrete examples of the material which answers the description, such ceramic substances as cordierite, mullite, α-alumina, zirconia spinel, and titania and such heat-resistant oxidationproof alloys as stainless steel, hastelloy, and inconel may be cited. The stainless steel is desired to incorporate aluminum therein or to have the surface thereof coated with an alumina film.

The honeycomb is desired to have a diameter in the range of from 10 to 200 cm. For the practical purpose, the lower limit of the honeycomb diameter is about 10 cm. When a plurality of honeycombs having a unit diameter smaller than this lower limit are to be joined into a bundle, it is necessary that the total diameter of the bundle be taken into account. The upper limit of the honeycomb diameter is about 200 cm. The honeycomb thus constructed is used for a one-piece combustor.

The length of the honeycomb is desired to be in the range of from 5 to 200 cm. If this length is less than 5 cm, the honeycomb will offer no ample contact time and will induce no fully satisfactory catalytic reaction. When a multiplicity of honeycombs having a smaller unit length are used in a connected state, the total length of the joined honeycombs must be taken into account. If the length of the honeycomb exceeds 200 cm, the honeycomb will prove to be undesirable from the practical point of view because of unduly large pressure loss in the flow paths for the combustion gas.

As respects the size of the flow paths which constitute the honeycomb, when the flow paths have a square cross section, the side of the square opening parts is desired to be in the range of from 1 to 25 mm from the practical point of view. When the flow paths have a hexagonal cross section, the largest diagonal line of the cross section is desired to be set in the range of from 1 to 25 mm. If the side or the diagonal line is less than the lower limit of the range, the pressure loss in the combustion gas flow paths will be unduly large. Conversely, if it exceeds the upper limit of the range, the available contact area between the catalyst of the inner wall surface of the combustion gas flow paths and the combustion gas will be unduly small and the efficiency of catalytic reaction will be proportionately degraded.

In the durable support which has the construction of the honeycomb described above, the deposition of the active catalyst in the form of a coating on the inner wall surfaces of the plurality of mutually partitioned and independent combustion gas flow paths is implemented by a procedure which comprises applying a paste composed of a catalyst powder and a binder to the inner wall surfaces of the combustion gas flow paths and thereafter sintering the applied layer of the paste. The binder, for example, may be made of $Al(OH)_3$ which is converted into $Al_2O_3$ by the sintering.

The application of the catalyst exclusively to one of each pair of adjoining flow paths (only in the parts filled in black in the pattern of a checkerboard, for example) is accomplished by fitting stoppers in the ends of the flow paths not desired to be coated with the catalyst, applying the paste to the inner wall surfaces of the combustion gas flow paths desired to be coated, and thereafter removing the stoppers. In cases where the removal of the stoppers is effected by such a method as grinding or cutting which shortens the length of the durable support, the durable support may be prepared in a slightly larger length so that the finished durable support will acquire a prescribed length at the end of the removal.

The combustion catalyst according to this invention is required to be so constructed that all the wall surfaces in part of the mutually partitioned and independent combustion gas flow paths or all the wall surfaces in at least one of each pair of adjoining combustion gas flow paths may avoid supporting thereon the active catalyst in the form of a coating. The reason for this construction is that the combustion catalyst is required to self-control the overall temperature thereof by enabling the heat generated by the combustion of the combustion gas flowing through the combustion gas flow paths coated with the active catalyst to be absorbed by the combustion gas flowing through the combustion gas flow paths not coated with the active catalyst.

When the combustion gas flow paths are arranged after the fashion of lattice, for example, the deposition of the active catalyst in the form of a coating on the inner wall surfaces is omitted in the combustion gas flow paths which are positioned contiguously to a combustion gas flow path having the inner wall surfaces thereof coated with the active catalyst on the upper and lower sides and the left and right sides thereof.

The combustor according to this invention comprises a fuel gas feed inlet, a gas combustion part connecting to the fuel gas feed inlet and effecting combustion of the combustion gas fed thereto, a high-temperature gas outlet part connecting to the gas combustion part and leading out a high-temperature gas generated by the combustion, and a combustion catalyst disposed in gas flow paths of the gas combustion part, wherein the combustion catalyst comprises a durable support containing a plurality of mutually partitioned and independent combustion gas flow paths and an active catalyst comprising mainly palladium and/or palladium oxide deposited on the inner wall surfaces of the combustion gas flow paths and is constructed so that the combustion gas flow paths supporting thereon the active catalyst and the combustion gas flow paths having no active catalyst deposited thereon (avoiding deposition of the active catalyst thereon) are present in a suitably mixed state.

In this invention, the flow paths in which the deposition of the palladium based active catalyst in the form of a coating is omitted do not need to exist throughout the entire length of the interior of the durable support from the uppermost through the lowermost part of the gas flow. When the combustor is so designed that the catalyst temperature at any position may not exceed the ignition point of the combustion gas composition at that position, the discrimination between the presence and the absence of the deposition of the active catalyst can be suitably made. When the catalyst is deposited on all the inner wall surfaces of all the flow paths in the area in which the catalyst temperature is low, for example, the length of the combustion catalyst can be decreased and the pressure loss lowered because the rise of the catalyst temperature can be quickened.

In the combustion catalyst according to this invention, the combustion gas flow paths having the active catalyst deposited thereon in the form of a coating and the combustion gas flow paths having no active catalyst deposited thereon in the form of a coating (avoiding the deposition of the active catalyst) are formed in a suitably mixed state. The combustion gas flows through all of these combustion gas flow paths. In the combustion gas flow paths having the active catalyst deposited thereon in the form of a coating, the combustion gas is combusted with evolution of heat owing to the action of the active catalyst. Since this heat is absorbed by the fuel gas which is flowing through the combustion gas flow paths having no active catalyst deposited thereon in the form of a coating (omitting the deposition of the active catalyst), the temperature of the active catalyst tends to fall by an amount equivalent to the heat quantity which has been absorbed as mentioned above. Owing to the self control property of the palladium based active catalyst (for fixing the catalyst temperature constant in the neighborhood of the equilibrium oxygen release temperature), the temperature of the active catalyst cannot be lowered below the equilibrium oxygen release temperature so long as the fuel gas has a sufficient fuel content. Thus, the combustion catalyst is enabled to manifest the same property as when the active catalyst is deposited in the form of a coating on the inner wall surfaces of all the combustion gas flow paths.

Moreover, as respects the combustion gas which flows through the combustion gas flow paths having the active catalyst deposited in the form of a coating on the inner wall surfaces thereof, the fuel gas concentration is lowered in the area in which the gas temperature is high on the combustion gas outlet side and the vapor-phase combustion is not easily induced in the combustion gas flow paths because the fuel gas is combusted in a large amount. Meanwhile, in the combustion gas flow paths having no active catalyst deposited in the form of a coating on the inner wall surfaces thereof, because of the absence of the action of the active catalyst, the concentration of the fuel gas is constant throughout the entire area in the combustion gas flow paths and the temperature of the fuel gas is elevated by the heat generated in the combustion gas flow paths having the active catalyst deposited in the form of a coating on the inner wall surfaces thereof and nevertheless the vapor-phase combustion having the catalyst surface as the source of ignition is not easily induced. In short, since the generation of the vapor-phase combustion of the combustion gas is totally or notably diminished in all the combustion gas flow paths that are provided for the catalyst of the combustor, the fusion or other similar deterioration of the active catalyst attendant on the vapor-phase combustion is eliminated in spite of a possible variation of the fuel gas concentration of the combustion gas. Thus, the catalyst for the combustor is enabled to function constantly with ample controllability and high reliability.

Further, as already remarked above, the flow paths in which the deposition of the palladium based active catalyst is deposited in the form of a coating do not need to be present throughout the entire length of the interior of the durable support from the uppermost through the lowermost part of the gas flow. When the catalyst for the combustor is so designed that the temperature thereof at any position may avoid exceeding the ignition point of the combustion gas composition at that position, the discrimination between the presence and the absence of the deposition of the active catalyst can be suitably attained. When the catalyst is deposited on all the inner wall surfaces of all the flow paths in the area in which the catalyst temperature is low, for example, the length of the combustion catalyst can be decreased and the pressure loss lowered because the rise of the catalyst temperature can be quickened.

When a plurality of combustion catalysts whose unit length in the direction of flow is smaller than the prescribed length are arranged in series in the direction of flow, the composite catalyst consequently formed can produce the same effect as the normal one-piece combustion catalyst. In this case, the flow paths may be arranged with a high degree of matching for the purpose of repressing the pressure loss to the fullest possible extent or they may be arranged with slight deviation for the purpose of facilitating exchange of gases.

Japanese Patent Laid-Open Publication No. SHO-61-259, 013 discloses a catalytic combustion device similar in construction with the combustor of this invention. This cited reference does not limit the main active component of the catalyst to a palladium system and aims mainly at simply cooling the overall temperature of the catalyst. When an active component other than a palladium system is used, therefore, the catalyst temperature in the neighborhood of the outlet of the combustion catalyst is markedly low as compared with the combustion catalyst which has the active catalyst deposited in the form of a coating in all the combustion gas flow paths. The catalytic combustion device of the cited reference is not found at all to bring about such an exaltation of controllability as is attained by the use of palladium.

DESCRIPTION OF THE PREFERRED EMBODIMENTS

Now, the working examples of this invention will be explained below with reference to FIG. 1, FIG. 2, FIG. 3, FIG. 4, and FIG. 5.

First, durable supports each of the shape of a honeycomb of cordierite (or stainless steel) measuring 30 mm in diameter and 18 cm in length and containing 16 partitioned combustion gas flow paths per square centimeter of cross section were prepared.

Figure 1:
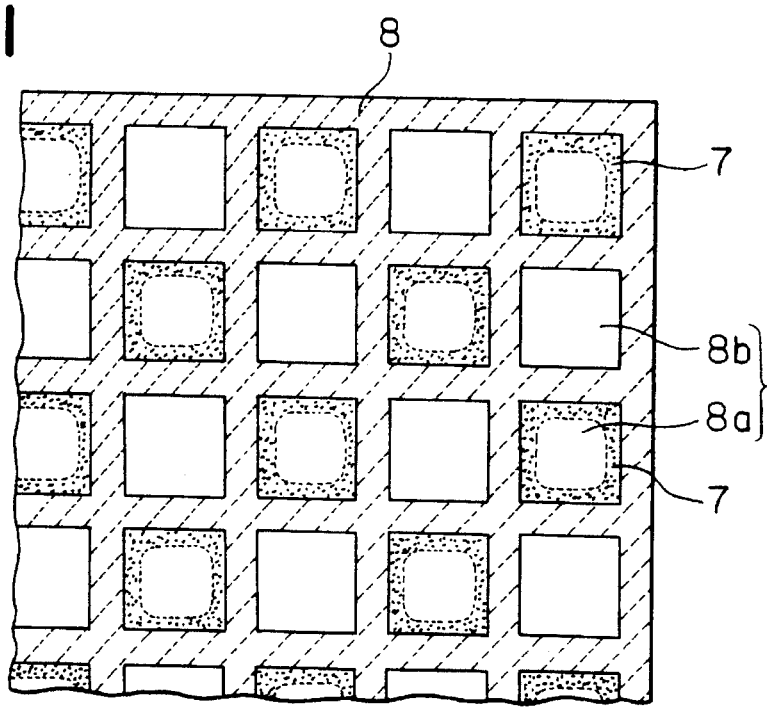
FIG. 1 is a cross section illustrating in a model an example of the construction of the essential part of a combustion catalyst according to this invention.
Figure 2:
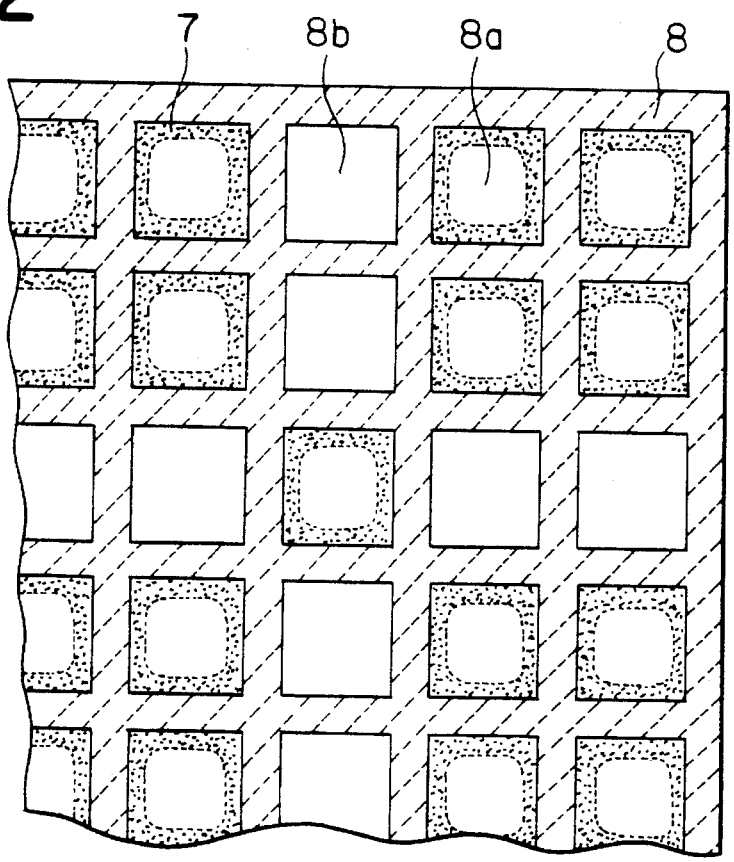
FIG. 2 is a cross section illustrating in a model another example of the construction of the essential part of a combustion catalyst according to this invention.

Combustion catalysts having essential parts thereof constructed as illustrated in cross section in FIG. 1 and FIG. 2 (Example 1 in FIG. 2 and Example 2 in FIG. 2) were obtained by depositing crude catalyst particles in the form of a coating layer on the inner wall surfaces of the combustion gas flow paths contained in the durable supports. The crude catalyst particles had been obtained by coating $Y_2O_3$-stabilized zirconia particles of an average particle diameter of 0.7 μm with palladium by the electroless plating technique. The weight ratio of the $Y_2O_3$-stabilized zirconia ($ZrO_2$) to the palladium (Pd) was 1:1 and the final average particle diameter of the crude catalyst particles was 1 μm.

The deposition of the crude particles in the form of a coating layer on the durable support was effected by carrying out a total of ten cycles of a procedure of preparing a slurry composed of 40 wt % of the crude particles and 60 wt % of $Al(OH)_3$, applying the slurry to the durable support, and drying the applied layer of the slurry. The dried coating layer of the slurry and the durable support were together heated under the conditions of 900° C. and six hours, to obtain a durable support carrying the catalyst particles.

Figure 8:
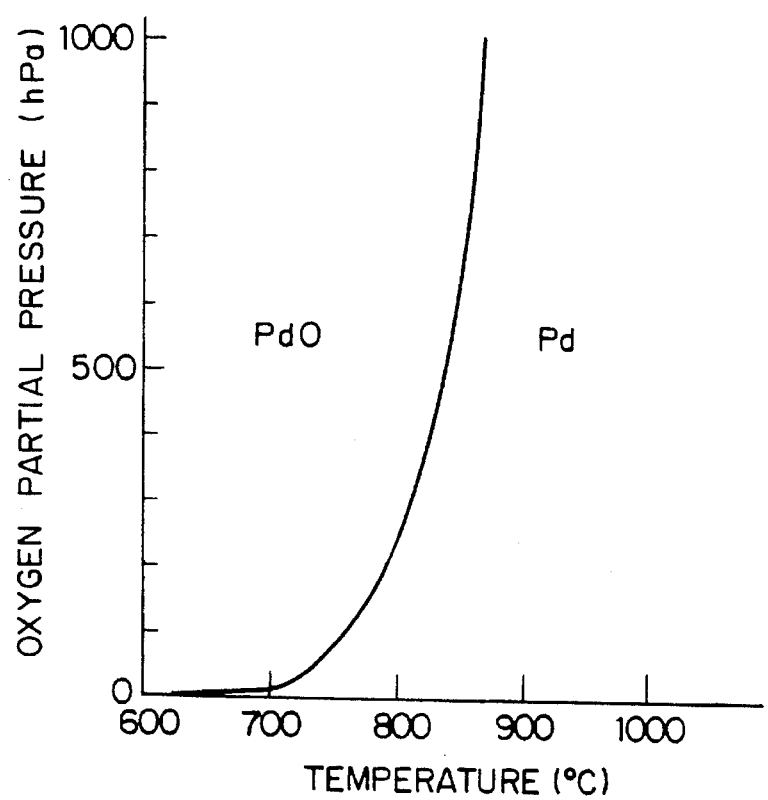
FIG. 8 is a diagram of curves showing an example of the relation between the release temperature of palladium oxide in a palladium based catalyst and the oxygen partial pressure.
Figure 9:
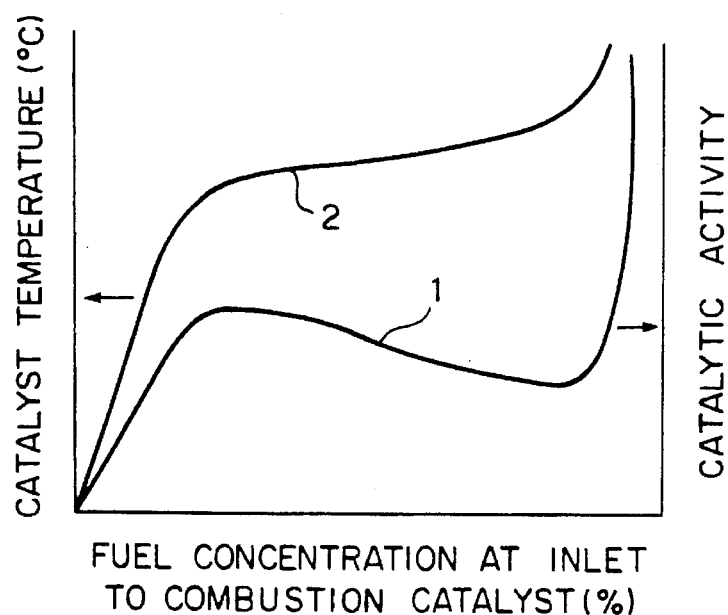
FIG. 9 is a diagram of curves showing an example of the property of the conventional combustion catalyst.

The flow paths not intended to carry the catalyst were sealed in advance of the application of the slurry by fitting stoppers in the end parts of the flow paths so as to keep the slurry from entering the flow paths and adhering to the inner wall surfaces thereof. Finally, the inlets and the outlets of the flow paths were cut off to afford a finished combustion catalyst having a length of 17 cm in the direction of gas flow. In FIG. 1 and FIG. 2, 8 stands for a durable support, 8a for a combustion gas flow path having an active catalyst 7 deposited in the form of a coating on the inner wall surfaces thereof, and 8b for a combustion gas flow path having no active catalyst 7 deposited in the form of a coating on the inner wall surfaces thereof (omitting the deposition). In the construction of FIG. 1, combustion gas flow paths 8b (or combustion gas flow paths 8a) are arranged contiguously to the combustion gas flow path 8a (or the combustion gas flow path 8a) on the upper and the lower side and the left and the left side thereof after the pattern of a checkerboard.

Concerning Example 1 and Example 2, the combustion gas flow paths 8a having the active catalyst 7 deposited thereon in the form of a coating have the coating of the active catalyst extended throughout the entire length thereof from the inlet through the outlet and the combustion gas flow paths 8b omitting the deposition of the active catalyst 7 in the form of a coating have the coating of the active catalyst omitted throughout the entire length thereof from the inlet through the outlet.

Figure 3:
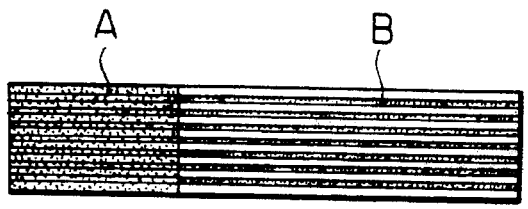
FIG. 3 is a cross section taken in the direction of flow to illustrate in a model yet another example of the construction of the essential part of a combustion catalyst according to this invention.

In Example 3, a combustion catalyst was so constructed as to have a catalyst deposited in the form of a coating on the inner wall surfaces of all the combustion gas flow paths in a part (A part) 5 cm in length from one end and have a construction of a cross section of FIG. 1 in the remaining part (B part) (cross section taken in the direction of the flow; FIG. 3). The combustion catalyst of Example 3 was produced by following the procedure of Example 1 and Example 2 while changing the positions for fitting stoppers.

Figure 4:
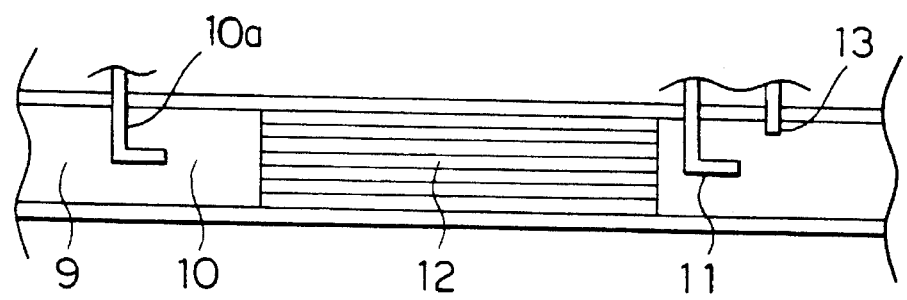
FIG. 4 is a cross section illustrating in a model an applied example of a combustion catalyst according to this invention.

Then, the combustion catalyst constructed as described above was set in place in an imitation gas turbine combustor and tested for durability. As shown in FIG. 4 which depicts an example of the construction of the essential part thereof, this gas turbine combustor is provided with a combustion gas feed path 10 adapted to mix a fuel gas with the air fed in as the oxidizing gas for combustion through the air feed inlet 9 and fitted on the lateral wall thereof with a combustion gas feed line 10a and a replenishing fuel feed inlet 11 serving to feed a replenishing fuel gas to the combustion gas. In this gas turbine combustor, a combustion catalyst 12 of the shape of a honeycomb was fitted between the gas feed path 10 for feeding the combustion gas and the replenishing fuel feed inlet 11 and tested for durability.

Figure 7:
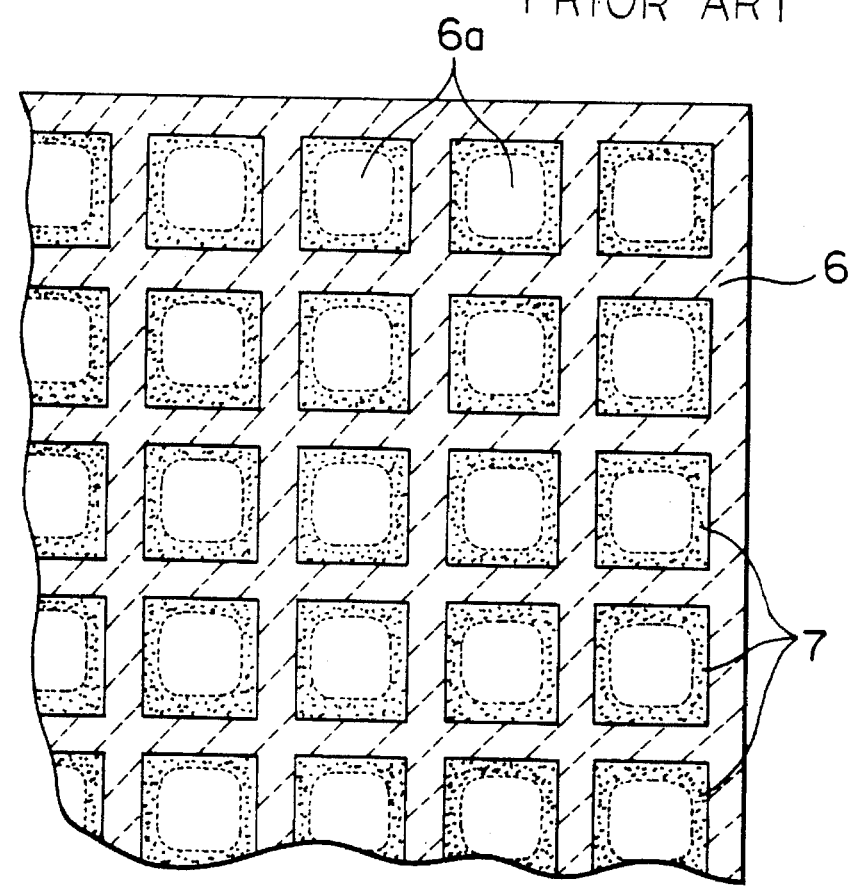
FIG. 7 is a cross section illustrating the construction of the essential part of the conventional combustion catalyst.

For the purpose of comparison, a combustion catalyst having a palladium based active catalyst 7 deposited in the form of a coating on the inner wall surfaces of all the combustion gas flow paths as shown in FIG. 7 (Comparative Example 1), a combustion catalyst having a platinum based active catalyst deposited in the form of a coating in the place of the palladium based active catalyst in the construction of Example 1 (Comparative Example 2), and a combustion catalyst having a platinum based active catalyst deposited in the form of a coating on the inner wall surfaces of all the combustion gas flow paths (Comparative Example 3) were prepared. These honeycomb type combustion catalysts were each set in place in the imitation gas turbine combustor mentioned above and tested for durability.

Figure 5:
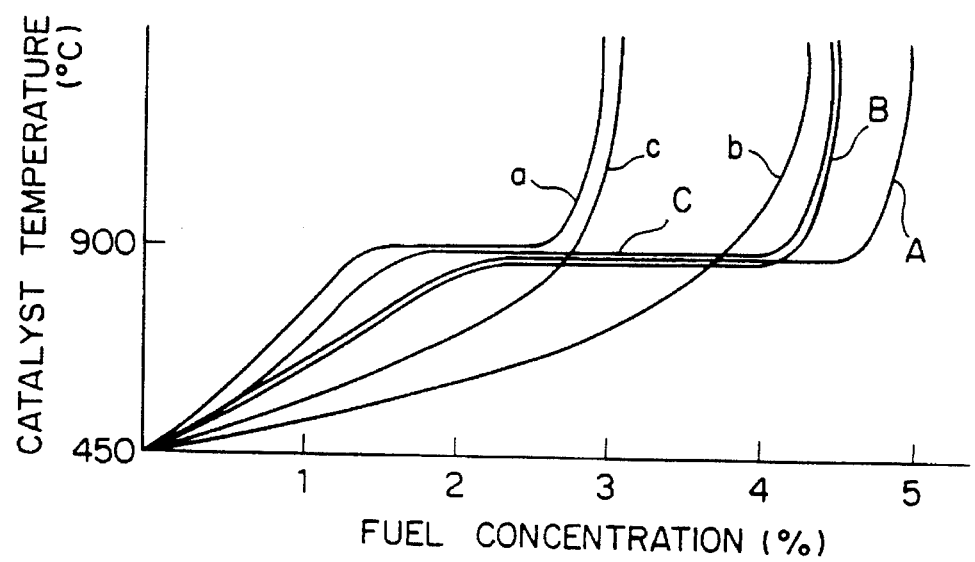
FIG. 5 is a diagram of curves showing the property of the combustion catalyst of the present invention in comparison with that of the conventional combustion catalyst.
Figure 6:
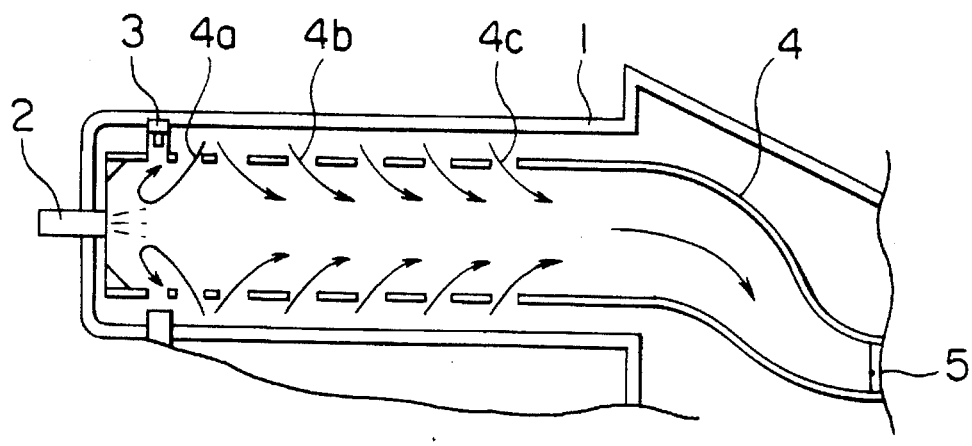
FIG. 6 is a cross section illustrating the construction of the essential part of the conventional combustor for a gas turbine.

In this test for durability, the air preheated to 450° C. was fed in through the air feed inlet 9 for combustion gas under the conditions of 0.2N-m³/min. and 0.7 MPa and the fuel gas was fed in through the gas feed path 10a with the fuel concentration thereof gradually increased and they were passed through a honeycomb type combustion catalyst 12 to determine the catalyst temperature as the function of the fuel concentration. The results of this test are shown in FIG. 5. In the diagram, the curve A represents the results of Example 1, the curve B those of Example 2, and the curve C those of Example 3. The curve a represents the results of Comparative Example 1, the curve b those of Comparative Example 2, and the curve c those of Comparative Example 3.

It is clearly noted from FIG. 5 that in the test using the combustion catalyst of Example 1, no vapor-phase combustion was observed in the combustion gas flow paths 8a and 8b when the fuel concentration at the inlet to the combustion catalyst was up to about 4.5%. When the fuel concentration surpassed 4.5%, the catalyst temperature suddenly rose, implying the occurrence of a vapor-phase combustion.

In the test of the combustion catalyst of Example 2, this combustion catalyst manifested a behavior similar to that of the combustion catalyst of Example 1 as an average of all the flow paths in the area in which the fuel concentration at the inlet to the combustion catalyst 12 was not more than 4%. It, however, brought about an uneven temperature distribution, a high temperature in the part in which the adjoining combustion gas flow paths had the catalyst deposited in the form of a coating on the inner wall surfaces thereof and a low temperature in the part in which the adjoining combustion gas flow paths omitted deposition of the catalyst in the form of a coating on the inner wall surfaces. The combustion gas initiated vapor-phase combustion when the fuel concentration at the inlet to the combustion catalyst 12 surpassed 4%.

In Example 3, the catalyst temperature was higher than that in Example 1 when the fuel concentration at the inlet to the combustion catalyst 12 was not more than 2% and the combustion gas initiated vapor-phase combustion when the fuel concentration at the inlet to the combustion catalyst 12 surpassed 4%. The outlet gas temperature of the combustion catalyst 12 of Example 3 was slightly higher than that of the combustion catalyst 12 of Example 1. This combustion catalyst 12 of Example 3 attained the same outlet gas temperature as that of the combustion catalyst 12 of Example 1 even the length of the combustion catalyst 12 was decreased by 1 cm.

In contrast, in the case of Comparative Example 1, the combustion catalyst induced vapor-phase combustion and ceased to manifest the function thereof in the combustion gas flow paths 8a when the fuel concentration at the inlet to the combustion catalyst 12 reached the neighborhood of 2.5%.

Then, in the case of Comparative Examples 2 and 3, the combustion catalysts both showed a discernible increase in the improvement of catalytic activity proportionately as the fuel concentration at the inlet to the combustion catalyst 12 grew. The catalyst temperature, however, varied with the variation of the fuel concentration at the inlet to the combustion catalyst 12. Further, around the time that the fuel concentration at the inlet to the combustion catalyst 12 surpassed 4% (Comparative Example 2) or 3% (Comparative Example 3), the combustion catalyst initiated vapor-phase combustion and induced a sudden rise of temperature in the combustion gas flow paths 8a, 8b, or 6a and ceased to manifest the catalytic function. In short, in the case of Comparative Examples 2 and 3, the catalyst systems were unstable and deficient in performance and could not easily satisfy the conditions necessary for practical service.

These results or trends remained unchanged even when the temperature for the preheating of the air or the flow rate of the air were changed. In the case of the test using the combustion catalyst of any of the working examples, the existence of an area of the fuel concentration at the inlet to the combustion catalyst 12 in which the combustion catalyst 12 could be stably used and this area was confirmed to be wider than that of Comparative Example 1.

When the combustion catalyst of Example 1 was used in the combustor (combustion system) mentioned above with the fuel concentration at the inlet to the combustion catalyst 12 fixed at 4% and the combustion gas ignited by the use of a spark plug 13 and put to complete combustion on the downstream side of the combustion catalyst 12, the amount of $NO_x$ generated was as low as about 2 ppm, no sign of vapor-phase combustion was detected in the combustion gas flow paths 8a and 8b, and the inner temperature of the combustion gas flow paths was stabilized in the neighborhood of 900° C. Separately, when the catalytic combustion was initiated with the fuel concentration at the inlet to the combustion catalyst 12 fixed at 3%, the replenishing fuel gas was introduced in an amount equivalent to 1% of fuel concentration through the feed inlet 11 for the fuel replenishment disposed on the downstream side of the combustion catalyst 12 and mixed with the combustion gas, and the combustion gas was ignited by the use of the spark plug 13 and put to complete combustion, the amount of $NO_x$ generated was as low as about 3 ppm and no sign of the occurrence of vapor-phase combustion was detected in the combustion gas flow paths 8a and 8b.

It should be noted that this invention is not limited to the constructions cited above but may be otherwise variously embodied and practiced without departure from the spirit of the invention. For example, the shape of the openings of the combustion gas flow paths and the manner of combination of the combustion gas flow paths having the palladium based active catalyst deposited in the form of a coating on the inner wall surfaces thereof and the combustion gas flow paths avoiding the deposition of the palladium based active catalyst in the form of a coating on the inner wall surfaces thereof may be suitably selected, set, or altered in conformity with the spirit of this invention.

The combustion catalyst according to this invention is such that when it is set in place in the combustion gas flow paths such as of a gas turbine combustor in which the combustion gas of a high temperature is flowing at a high flow rate, the combustor can be operated with a high catalytic efficiency and a low nitrogen oxide quality kept intact, precluded from the possibility of inducing vapor-phase combustion in the combustion catalyst, and prevented from entailing deterioration of catalytic function or destruction of catalyst as described above. In short, the combustion catalyst according to this invention brings about many advantages from the practical point of view because it enables the turbine combustor, for example, to be operated stably for a long time with high controllability.

What is claimed is:

1. A combustion catalyst, comprising:

a honeycomb shaped durable support containing a plurality of mutually partitioned and independent combustion gas flow paths; and an active catalyst comprised mainly of palladium and/or palladium oxide and deposited on inner wall surfaces of a portion of said combustion gas flow paths;

wherein said deposition of said active catalyst is omitted from all the inner wall surfaces of another portion of said combustion gas flow paths so that inner wall surfaces of some of said combustion gas flow paths contain the active catalyst and inner wall surfaces of other gas flow paths are free of the active catalyst.

2. A combustion catalyst, comprising:

a durable support containing a plurality of mutually partitioned and independent combustion gas flow paths arranged in a series of adjoining pairs; and an active catalyst comprised mainly of palladium and/or palladium oxide and deposited on inner wall surfaces of a portion of said combustion gas flow paths, wherein said active catalyst is deposited on inner wall surfaces of only one of each of said adjoining pairs of gas flow paths, and wherein the other of each adjoining pair is substantially free of the active catalyst.

3. A combustion catalyst, comprising:

a honeycomb shaped durable support containing a plurality of mutually partitioned and independent combustion gas flow paths, wherein said durable support comprises a first durable support part provided with combustion gas flow paths having an active catalyst comprised mainly of palladium and/or palladium oxide deposited on all inner wall surfaces thereof and disposed at a combustion gas inlet side of the honeycomb shaped durable support; and a second durable support part provided with combustion gas flow paths having said deposition of said active catalyst on inner wall surfaces thereof partly omitted, said second durable support part being disposed at a combustion gas outlet side of the honeycomb shaped durable support, and the first and second durable support parts being disposed in series in a direction of flow of combustion gas.

4. A combustion catalyst according to claim 1, wherein said flow paths are partitioned in a lattice fashion and include openings of square cross-section.

5. A combustion catalyst according to claim 1, wherein said gas flow paths are partitioned in a lattice fashion and have openings of hexagonal cross-section.

6. A combustion catalyst according to claims 1, 2, or 3, wherein said durable support comprises at least one member selected from the group consisting of such ceramic materials as cordierite, mullite, α-alumina, zirconia spinel, and titania.

7. A combustion catalyst according to claims 1, 2, or 3, wherein said durable support comprises at least one member selected from the group consisting of such metallic materials as stainless steel, hastelloy, and inconel.

8. A combustion catalyst according to claims 1, 2, or 3, wherein said combustion catalyst contains an oxide of a transition metal element as a carrier for supporting thereon said active catalyst.

9. A combustor comprising a fuel gas feed inlet, a gas combustion part connecting to said fuel gas feed inlet and effecting combustion of the combustion gas fed thereto, a high-temperature gas outlet part connecting to said gas combustion part and leading out a high-temperature gas generated by the combustion, and a combustion catalyst disposed in gas flow paths of the gas combustion part, wherein said combustion catalyst comprises a durable support containing a plurality of mutually partitioned and independent combustion gas flow paths and an active catalyst comprising mainly of palladium and/or palladium oxide and deposited on the inner wall surfaces of said combustion gas flow paths and said deposition of said active catalyst on all the inner wall surfaces is omitted in part of said combustion gas flow paths.

10. A combustor, comprising:

a fuel gas feed inlet;

a gas combustion part connected to said fuel gas feed inlet for effecting combustion of combustion gas fed thereto;

a high-temperature gas outlet part connected to said gas combustion part for outputting a high-temperature gas generated by combustion; and a combustion catalyst disposed in the gas combustion part and including a durable support containing a plurality of mutually partitioned and independent combustion gas flow paths arranged in adjoining pairs, and an active catalyst material comprised mainly of palladium and/or palladium oxide and deposited on inner wall surfaces of one of each of said pair of flow paths, and wherein another of each of said pair of flow paths have inner wall surfaces that are substantially free of said catalyst material.

11. A combustor, comprising:

a fuel gas feed inlet;

a gas combustion part connecting to said fuel gas feed inlet for effecting combustion of combustion gas fed thereto;

a high-temperature gas outlet part connected to said gas combustion part for outputting a high-temperature gas generated by combustion; and a combustion catalyst disposed in gas flow paths of the gas combustion part, wherein said combustion catalyst comprises first and second durable support parts each containing a plurality of mutually partitioned and independent combustion gas flow paths, and wherein the gas flow paths of the first durable support part is provided with an active catalyst comprised mainly of palladium and/or palladium oxide deposited on substantially all the inner wall surfaces thereof and the inner wall surfaces of the second durable support part is substantially free of the active catalyst material, and wherein said first and second durable support parts are respectively disposed in series in a direction of flow of combustion gas.

* * * * *

UNITED STATES PATENT AND TRADEMARK OFFICE
CERTIFICATE OF CORRECTION

PATENT NO. : 5,577,906
DATED : November 26, 1996
INVENTOR(S) : Yoshio HANAKATA et al.

It is certified that error appears in the above-indentified patent and that said Letters Patent is hereby corrected as shown below:

Claim 9, column 14, line 7, after "comprising" insert --:--,
after "inlet" delete "," and insert --;--;

line 8, "connecting" should read --connected--, delete "and" and insert --for--;

line 9, delete "the", after "thereto" delete "," and insert --;--;

line 10, "connecting" should read --connected--;

line 11, delete "and leading out" and insert --for outputting--;

line 12, delete "the", after "combustion (first occurrence)" delete "," and insert --;--.

UNITED STATES PATENT AND TRADEMARK OFFICE
CERTIFICATE OF CORRECTION

PATENT NO.   : 5,577,906
DATED        : November 26, 1996
INVENTOR(S)  : Yoshio HANAKATA et al.

It is certified that error appears in the above-indentified patent and that said Letters Patent is hereby corrected as shown below:

Claim 9, column 14, line 16, after "paths" insert --having inner wall surfaces,--;

line 17, before "comprising" insert --material--, "comprising" should read --comprised--, after "oxide' insert --,--;

UNITED STATES PATENT AND TRADEMARK OFFICE
CERTIFICATE OF CORRECTION

PATENT NO. : 5,577,906
DATED : November 26, 1996
INVENTOR(S) : Yoshio HANAKATA et al.

It is certified that error appears in the above-indentified patent and that said Letters Patent is hereby corrected as shown below:

lines 18-21, after "and (beginning of line 18)" delete "deposited on the inner wall surfaces of said combustion gas flow paths and said deposition of said active catalyst on all the inner wall surfaces is omitted in part of said combustion gas flow Paths" and insert --wherein a portion of said inner wall surfaces contain said catalyst material deposited thereon, and another portion of said inner wall surfaces are substantially free of the catalyst material--.

Signed and Sealed this

First Day of July, 1997

Attest:

Attesting Officer

BRUCE LEHMAN

Commissioner of Patents and Trademarks